(12) United States Patent
Huang et al.

(10) Patent No.: US 6,439,254 B1
(45) Date of Patent: Aug. 27, 2002

(54) MASS FLOW CONTROLLER AUTOMATION METHOD AND RELATED SYSTEM

(75) Inventors: Yung-Ju Huang; Yun-Sheng Chung, both of Taipei; Hann-Tsong Wang, Hsin-Chu Hsien; Mu-Huo Cheng, Chang-Hua Hsien; Wen Jiang Yang, Kao-Hsiung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/727,653

(22) Filed: Nov. 30, 2000

(51) Int. Cl.[7] .................. F16K 31/02; G05B 13/00; G05D 7/06
(52) U.S. Cl. .................. 137/10; 137/487.5; 700/50; 706/3; 706/4; 706/903
(58) Field of Search .................. 137/10, 12, 14, 137/487.5; 700/50, 282; 706/3, 4, 900, 902, 903

(56) References Cited

U.S. PATENT DOCUMENTS

| | | | | |
|---|---|---|---|---|
| 5,266,756 A | * | 11/1993 | Hatano, Kazuhiro | 187/285 |
| 5,410,495 A | * | 4/1995 | Ramamurthi, Krishnamoorthy | 702/100 |
| 5,895,458 A | * | 4/1999 | Nishidai et al. | 706/3 |
| 6,289,274 B1 | * | 8/1999 | Martucci et al. | 701/100 |

OTHER PUBLICATIONS

Kyriakides et al., Adaptive Fuzzy Dominant–Pole placement control, 12—1992, IEEE.*

* cited by examiner

Primary Examiner—Michael-Powell Buiz
Assistant Examiner—Ramesh Krishnamurthy
(74) Attorney, Agent, or Firm—Pro-Techtor International Services

(57) ABSTRACT

An MFC controlling device automation method and related system. The method mainly comprises the steps of automatically controlled algorithmic obtaining of MFC open loop system parameters by an identification technique; automatically controlled algorithmic determining of PI control parameters by a dominant pole-placement method; and automatically controlled calculating of a fuzzy logic rule table. The steps form an automatically controlled single closed loop. By performing said steps, multiple PI control parameter sets are obtainable fast and in an automatic way, and a calculation is done to form a refined fuzzy rule data table, so that a greatly enhanced MFC reaction function is attained.

9 Claims, 6 Drawing Sheets

Openloop System

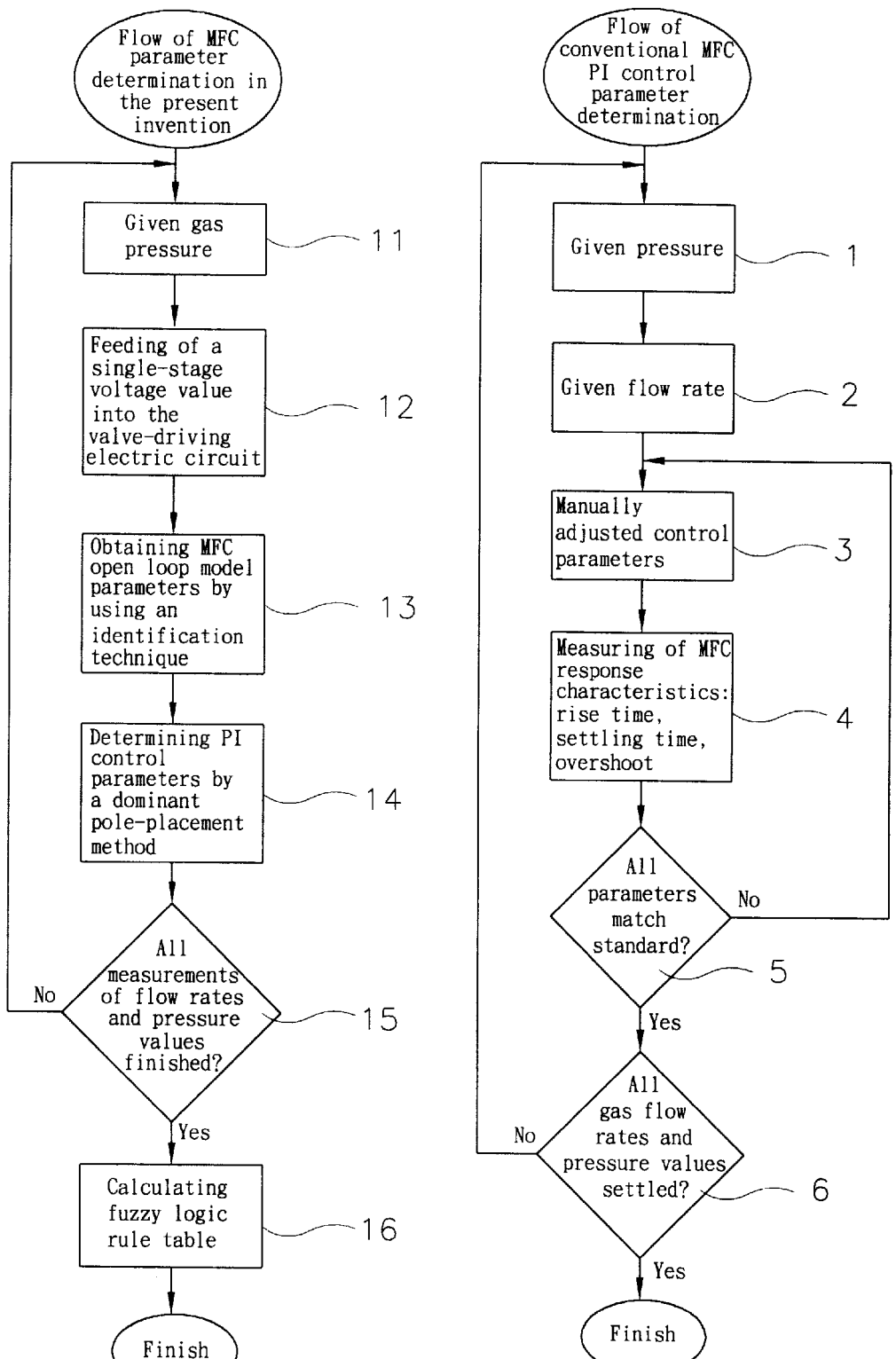

Delay

MASS FLOW CONTROLLER AUTOMATION METHOD AND RELATED SYSTEM

BACKGROUND OF THE INVENTION

1. Field of the Invention

The present invention relates to a method for enhancing the controlling function of a mass flow controller (MFC) controlling device and for automation thereof and further relates to a corresponding system.

2. Description of Related Art

A conventional MFC controlling device mostly uses a PI or PID controller. The controlling device works by manual adjusting with parameters that are set empirically, based on response signals of a measured gas flow which are combined.

FIG. 2 is a flow chart of a manually adjusted PI controller of a conventional MFC controlling device. At a given pressure 1 and a given flow rate 2, manually adjusted control parameters 3 are applied to the MFC controlling device. Response characteristics 4 of the MFC are measured, like rise time, settling time and overshoot. Only after passing a judgment whether all parameters match a standard 5 in the positive, further conditions of the pressure and gas flow are determined, and equal manually adjusted control parameters 3 are applied. These steps are repeated until a judgment whether pressure values and gas flow rates have been completely settled 6 is done in the positive, which finishes the process. This conventional process has an inner and an outer loop, with parameters that often contradict each other and are difficult to harmonize. Therefore the conventional method of manual control parameters is difficult to perform, inefficient and slow, leaving the quality of produced articles hard to control. To summarize, a conventional MFC controlling device has the following three grave disadvantages:

1. When the conventional method of manual control parameters is applied to an MFC controlling device, manual measurements have to be performed repeatedly and adjustments need to be done in a complicated process. Therefore, appropriate adjusting of control parameters in a method using a conventional MFC controlling device requires a lot of time and effort. Simply said, a method using a conventional MFC controlling device is inefficient and not economical.

2. Generation of MFC valve exhaust: Basically, an MFC controlling device has to be adapted to pressures of 8–50 psi for regular operation. However, in practice, an MFC valve has characteristics which naturally vary with changes of working gas pressure and flow. Therefore, only after having passed through all kinds of pressure and flow values and through several measurement cycles, control parameters will arrive at suitable values. Occasionally, manual empirically based parameters take a lot of time and still do not find suitable values. Under economic constraints, often discarding the MFC state has to be considered, which is wasteful.

3. Poor capacity of the MFC controlling device: Since the MFC valve has changing characteristics under varying gas pressure and flow, using a manually control led MFC controlling device even at great effort often implies only one or two sets of PID control parameters. Therefore, the response characteristics of a manually control led MFC controlling device in practice do not warrant generating and maintaining good controlling behavior under various working flows and pressures. For these reasons, the control characteristics of conventional MFC controlling devices need to be improved.

SUMMARY OF THE INVENTION

It is an object of the present invention to provide a mass flow controller controlling device automation method and related system which combines an identification technique and fuzzy theory, so as to achieve an enhanced controlling function of the mass flow controller as well as an increased economical effect thereof.

Another object of the present invention is to provide a process for generating parameters in a mass flow controller controlling device which needs no manual adjusting, working automatically, so as to increase production rates and reduce costs.

By achieving the above objects, the present invention completely resolves the three disadvantages of conventional MFC controlling devices, offering as a main advantage a good economical effect of the MFC valve.

The present invention can be more fully understood by reference to the following description and accompanying drawings.

BRIEF DESCRIPTION OF THE DRAWINGS

FIG. 1 is a flow chart of the MFC controlling device automation method of the present invention.

FIG. 2 is a flow chart of a conventional MFC controlling device using manually adjusted PI control.

DETAILED DESCRIPTION OF THE PREFERRED EMBODIMENT

Figure 3:
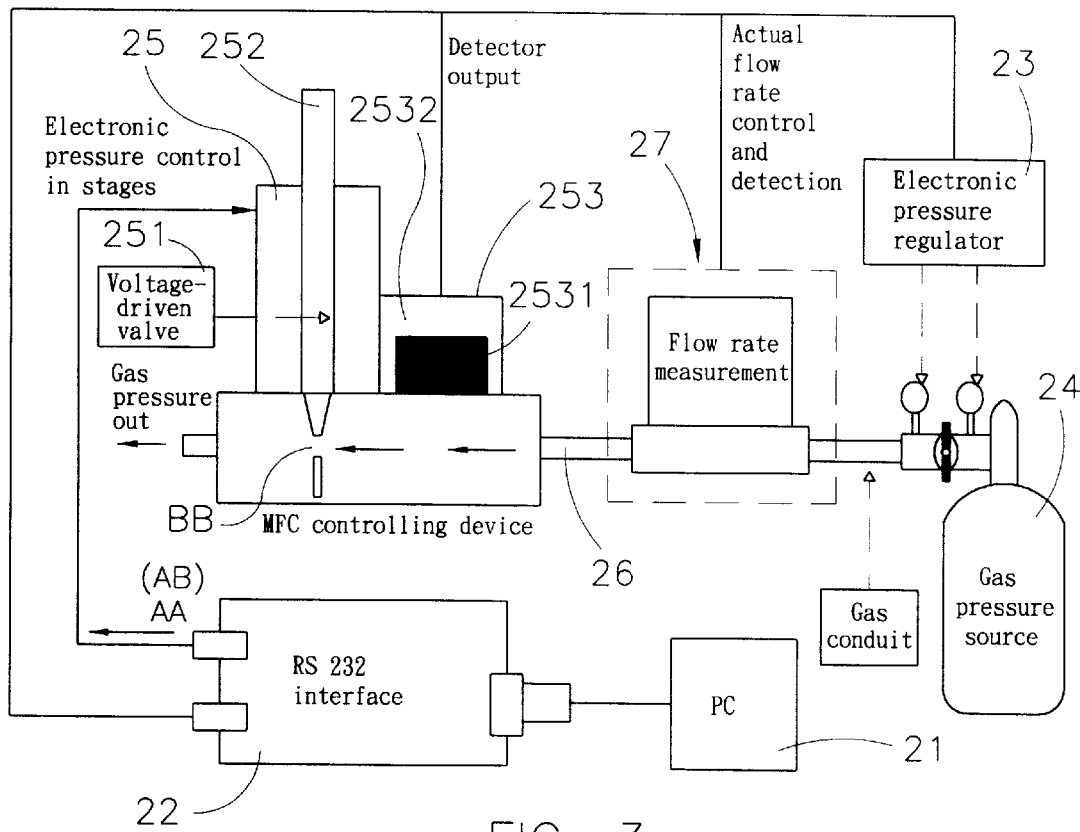
FIG. 3 is a schematic illustration of the automation system for the MFC controlling device of the present invention.

FIG. 1 is a flow chart of the MFC controlling device automation method of the present invention. A given gas pressure 11 is converted to an input of a single-stage voltage to a valve-driving electric circuit 12, so as to fix a valve at a degree of opening for a certain flow rate. In a measurement, a flow rate detector of the MFC controlling device gives out a flow rate signal. Using an identification technique, MFC open loop system model parameters 13 are calculated. After that, using a dominant pole-placement method, control parameters 14 for an MFC PI controller are obtained. From there, by passing a judgment 15 at various gas pressure values and flow rates, performing the above steps automatically generates a set of different PI parameters. After the judgment whether all measurements of gas pressure values and flow rates have been finished 15 is done in the positive, these control parameter values are calculated by a fuzzy theory technique to create a fuzzy rule data table 16. As shown in FIG. 1, the flow in the MFC controlling device automation method of the present invention has been improved, containing just a single closed loop. Moreover, the MFC controlling device works with a process that does not require manual adjusting. Thus all processes are automatic.

FIG. 3 is a schematic illustration of the automation system for the MFC controlling device of the present invention. A personal computer 21 controls via an RS 232 interface 22 or another connection an automatic electronic pressure regulator 23 for regulating a gas pressure source 24. The personal computer 21 issues via the RS 232 interface 22 or another connection a single-stage voltage AA, which is input to an MFC valve-driving electric circuit 25, controlling a voltage-driven valve 251. A valve gate 252 at the voltage-driven valve 251 reacts accordingly with a proportional fixed degree of opening BB and a gas flow rate. By a flow detecting device 253, changes in the flow rate are known and become input data of the valve-driving electric circuit 25. Monitoring of the actual gas flow is performed by a flow controlling device 27, mounted at a gas conduit 26 of the MFC controlling device and controlled by the personal computer 21 via the RS 232 interface 22 or another connection. The personal computer 21 uses these monitoring data and an identification technique, to calculate the MFC open loop system model parameters 13. After that, the personal computer 21, using a dominant pole-placement method as a calculating model, obtains required control parameters 14 for the MFC PI controller. Then the personal computer 21 automatically controls the electronic pressure regulator 23 to set a different gas pressure and a different voltage AB in a new step, controlling the voltage-driven valve 251. The above steps of the flow are repeated. Thus a circular process results, and various sets of PI control parameters at different flow rates and pressures are obtained. After having acquired all PI control parameters within a pressure range of 8–50 psi, the personal computer 21 calculates a more refined fuzzy rule data table 16, based on these sets of PI control parameters and using the fuzzy rule technique. The data of this table are transmitted to the controlling device on the MFC valve-driving electric circuit 25. Thus creating of the MFC controlling device is completed. The flow controlling device 27 is a standard flow controlling device, taking a flow value as a known standard, which is a base for correcting all system parameters, and serves as the main agent for collecting flow data for the personal computer 21.

Obtaining the MFC model parameters is possible by utilizing various identification techniques. The present invention uses the SMM method [1] for obtaining parameters. The present invention employs a delay system forming two stages to establish a realistic response model of the MFC, with the following mathematical formula:

$$H(z) = z^{-\gamma} \frac{\alpha_0 + \alpha_1 z^{-1}}{1 + \beta_1 z^{-1} + \beta_2 z^{-2}}$$

where $z^{-1}$ is a delay work factor, $\gamma$ is the delay time, and $\alpha_0$, $\alpha_1$, $\beta_1$, $\alpha_2$ are system model parameters. The delay time is directly obtained from measured signals, and the model parameters are calculated using the SMM method.

Figure 4:
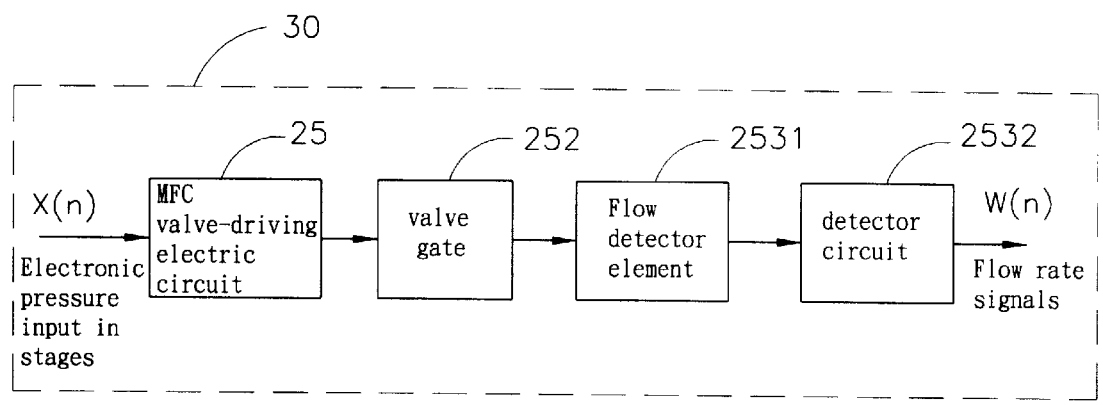
FIG. 4 is a diagram of the open loop of the MFC system.

FIG. 4 is an MFC open loop diagram 30, comprising the MFC valve-driving electric circuit 25, the valve gate 252, a flow detector element 2531, and a detector circuit 2532. The system identification technique thereof is constituted by using an input signal x(n) shown in the Fig. and a measurement output signal w(n) to calculate the delay time $\gamma$ and the system parameters $\alpha_0$, $\alpha_1$, $\beta_1$, $\beta_2$.

Figure 5:
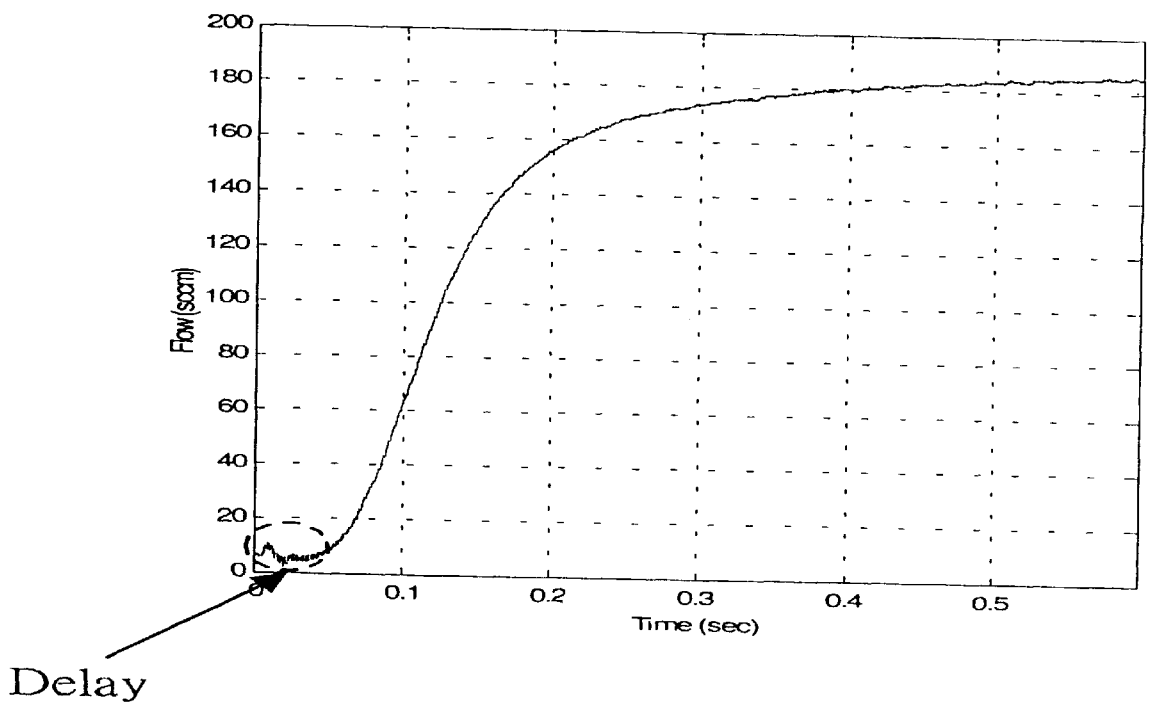
FIG. 5 is a plot of the response signal in stages of the open loop of the MFC controlling device.

FIG. 5 shows a typical response signal in stages of the MFC open loop.

Figure 6:
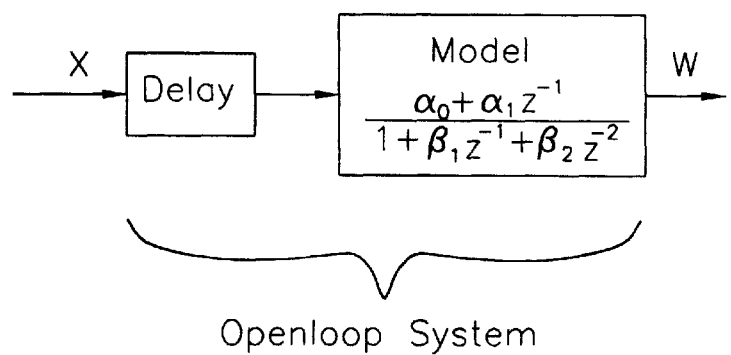
FIG. 6 is a diagram of the model of the open loop of the MFC controlling device.

FIG. 6 is a diagram of a typical model of the MFC open loop. Actually measured signals give evidence of a time delay and of two stages, which are suitable for establishing the MFC open loop.

The dominant pole-placement method for determining the PI control parameters works as follows: A digital controller system $G_C(z)$ is modeled by $$G_C(z) = K_P + K_I \frac{T_S(1 + Z^{-1})}{2(1 - Z^{-1})}$$

where $K_P$ and $K_I$ are PI control parameters, and $T_S$ is the sample time. A dominant pole-placement method determines the values of $K_P$ and $K_I$, so as to place a pole $Zd = r\, e^{\pm j\theta}$ as a zero of a closed-loop function. This yields $$1 + G_{C_i}(z)\, H(z)|_{z=z_d} = 0$$

where iH(z) is the system model obtained by the system identification technique and the delay system. By determining the parameters $K_P$ and $K_I$ using this method, the poles of the MFC closed loop control system take the determined positions. Thus positions of dominant poles are chosen, so that the response characteristics are as required. Since the MFC open loop is subject to various pressure values and voltage values of different stages, the model parameters obtained by the system identification technique vary, as well. Therefore, the PI control parameters determined at equal poles will be not equal, too.

Figure 7:
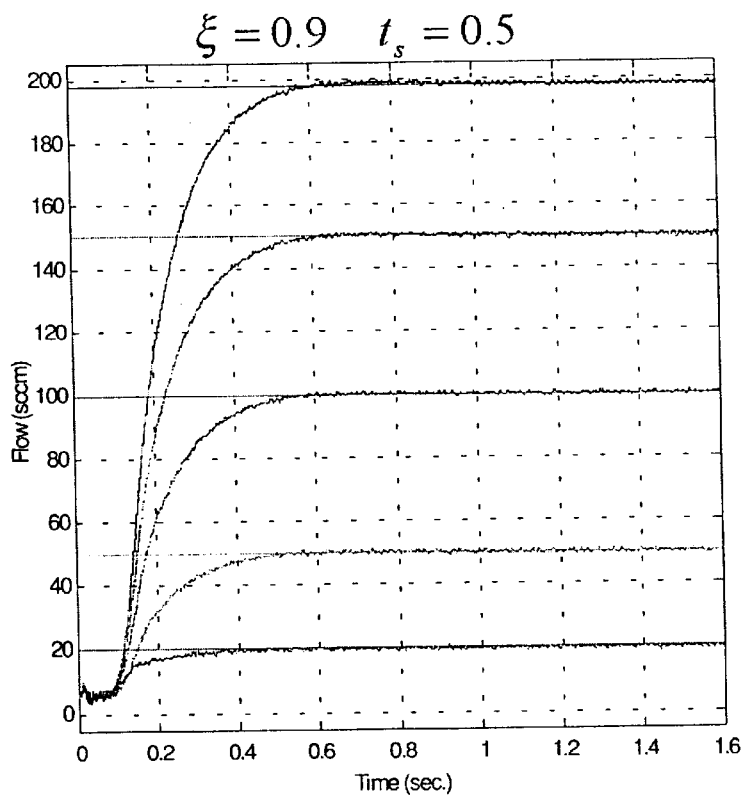
FIG. 7 is a plot of the response of the MFC controlling device at a pressure of 50 psi and different flow rates, using various PI parameters.

FIG. 7 shows the response of the MFC controlling device at a pressure of 50 psi and different flow rates, using various PI parameters. Shown therein are flow rate signals, measured at a pressure of 50 psi and flow rates of 20, 50, 100, 150 and 200 sccm and obtained by taking each of the open loop model parameters by the system identification technique and using the closed loop system formed by the determined PI controller parameters. From this Fig. it is known that, for the MFC control system determined by this method, the speed of response is high, the settling time is small, and there is no overshoot, fulfilling demands of industry.

Figure 8:
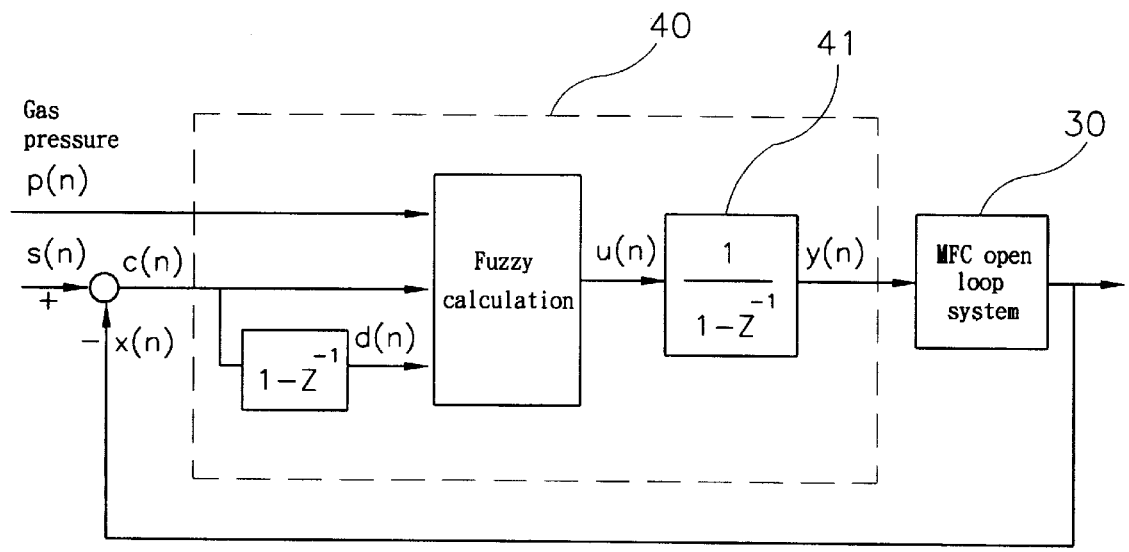
FIG. 8 is a diagram of the control system of the MFC controlling device.

FIG. 8 shows the control system of the MFC controlling device. Due to different pressure values and flow rates, various PI control devices result. However, in practice, the large number of PI control devices actually obtained lead to difficulties and too high costs. Therefore, the present invention employs a fuzzy logic technique embodied in a fuzzy control device 40 to combine various control devices, so that response characteristics thereof approach the response of the many PI control devices. Thus the above problem is solved.

The present system first generates the difference of a determined flow rate s(n) and a measured flow rate x(n), yielding e(n)=d(n)−x(n), then the difference value d(n)=e(n)−e(n−1), and the measured pressure value p(n).

Figure 9:
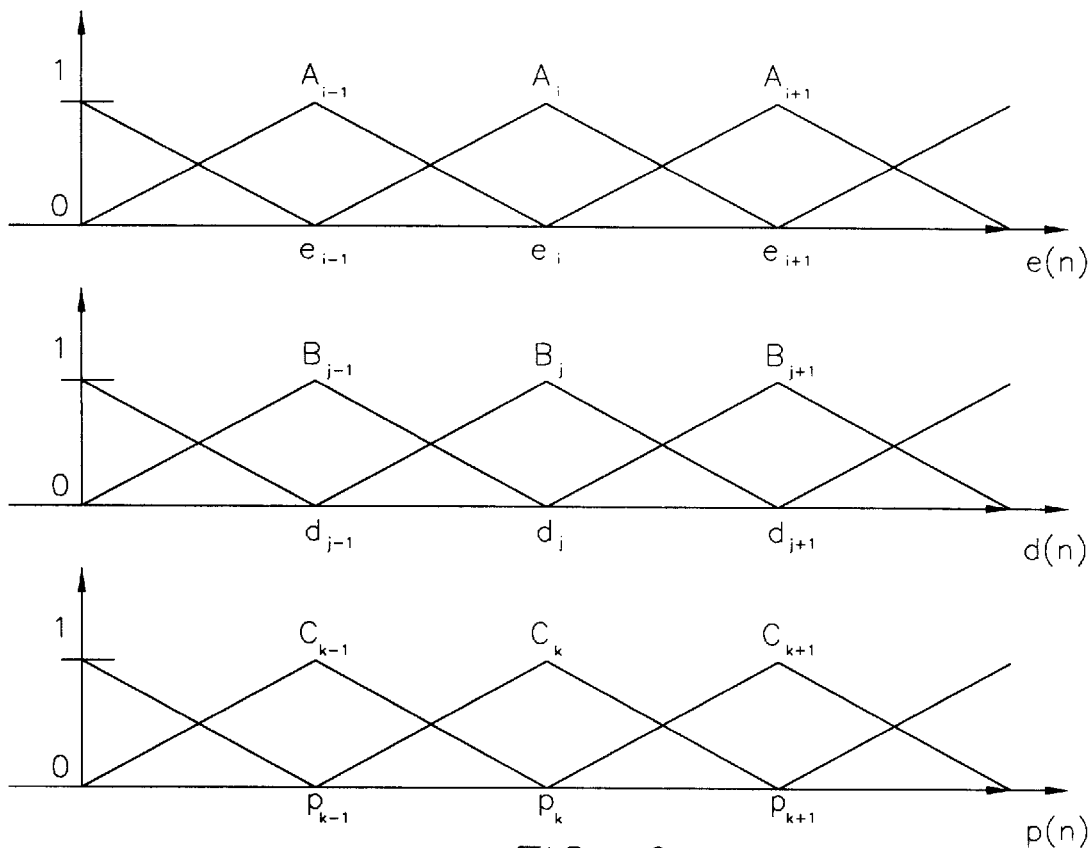
FIG. 9 is a functional diagram of the functions $A_i$, $B_j$ and $C_k$.

FIG. 9 is a functional diagram of the functions $A_i$, $B_j$ and $C_k$. After obtaining the above values, the present system from e(n), d(n), p(n) takes the functions shown in FIG. 9 to perform fuzzification. Then, from the fuzzified output values $A_i$, $B_j$ and $C_k$ the fuzzy rule data table is taken to obtain by a center-of-gravity method an output value u(n). From this, by passing a weighting device 41, a controller output value y(n) is evaluated.

Figure 10:
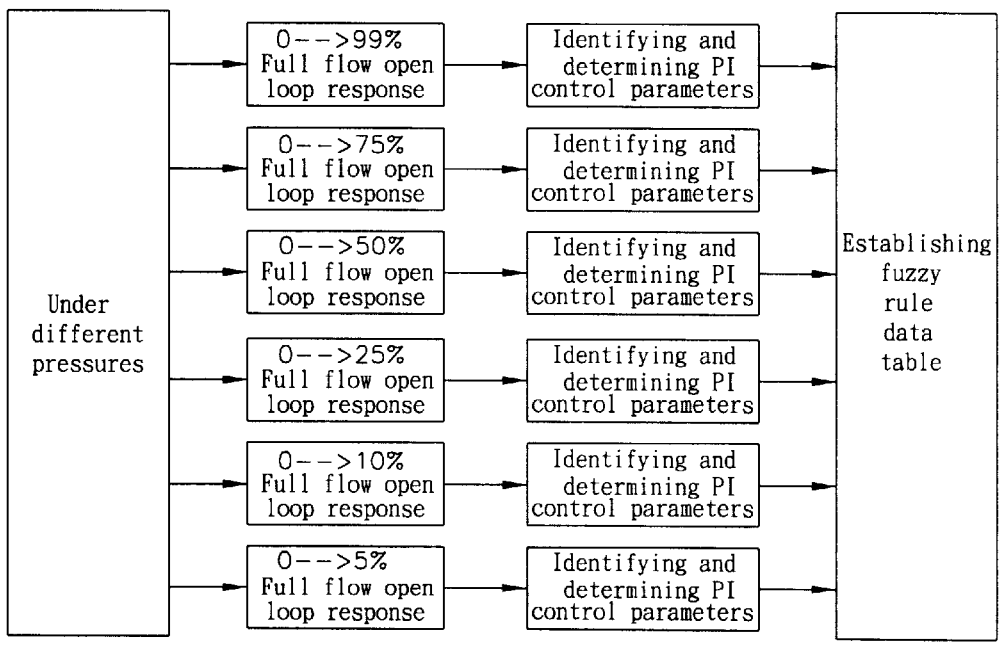
FIG. 10 is a diagram of establishing of the fuzzy data table.

FIG. 10 is a diagram of establishing of the fuzzy data table. Establishing of the fuzzy data table is done by calculating the PI controller from different flow rates and pressure values. This method is shown in FIG. 10. The following calculation is used:

$$g(i,j,k) = f(e_i, d_j, p_k) = K_P(e_i, d_j, p_k)e_i + K_I(e_i, d_j, p_k)d_j$$

where $e_i$ is an error value, $d_j$ is a difference of error values, $p_k$ is the pressure value, and $K_P$ and $K_I$ are average values of PI parameters obtained by the dominant pole-placement method while the pressure value is $p_k$ and the response of the open loop system is $e_i$, $d_j$. The result u(n) of the fuzzy calculation is calculated using a center-of-gravity method, the functions $A_i$, $B_j$ and $C_k$ which correspond to e(n), d(n), p(n) and the fuzzy rule data table. Finally, the controlling device output y(n) is obtained from u(n) by consulting the weighting device (see FIG. 8).

Figure 11:
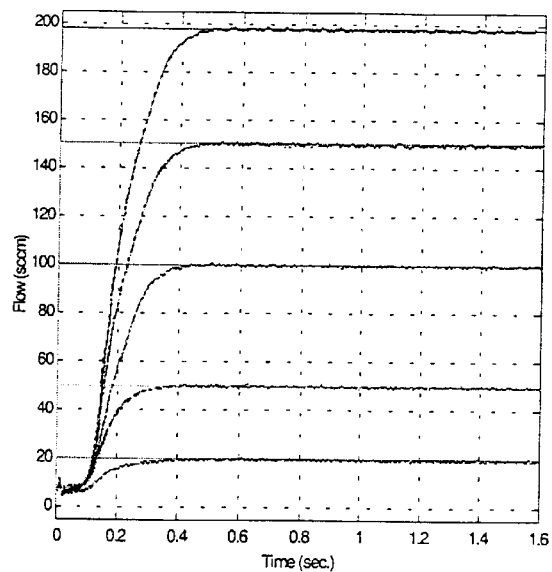
FIG. 11 is a plot of a response measurement at a flow rate of 200 sccm, using the method of the present invention.
Figure 12:
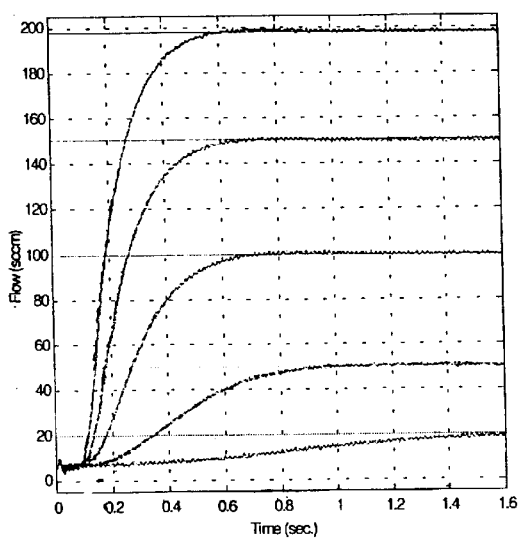
FIG. 12 is a plot of a response measurement at a flow rate of 200 sccm, using a single PI controller.
Figure 13:
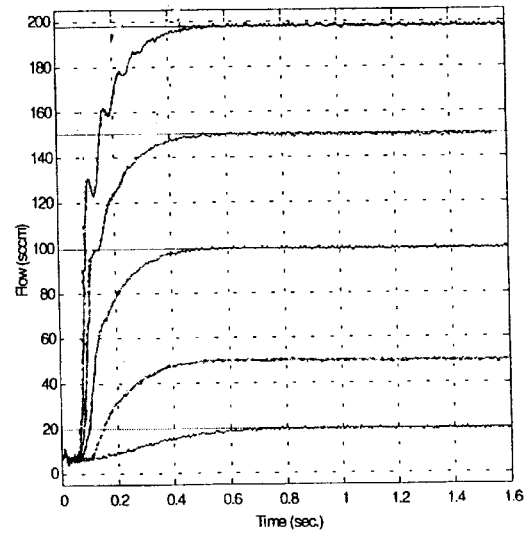
FIG. 13 is a plot of a response measurement at a flow rate of 200 sccm, using a single PI controller.

For comparing results, FIG. 11 shows a response measurement at a flow rate of 200 sccm, using the method of the present invention. FIGS. 12 and 13 show a response measurement at a flow rate of 200 sccm, using a single PI controller. Comparing FIGS. 11 and 12 reveals that the PI control parameters of FIG. 12 generate a smooth response, but at low flow rates response is slow. The PI control parameters of FIG. 13 generate a fast response, but at high flow rates response is not smooth. Comparing FIGS. 11, 12 and 13 clearly shows the improved response behavior ensured by the controlling device of the present invention.

Basically, the MFC controlling device brought forward by the present invention encompasses measurements of gas pressure. If, however, a gas pressure measuring apparatus is lacking, a similar fuzzy controlling device is usable. If values of relatively high gas pressures are used, then the steps of the present invention still result in a better controlling device than a pure single PI controller. Simply said, using the present invention will effectively enhance and improve the function and production rate of MFC controlling devices.

To sum up, the present invention mainly uses an identification technique and a dominant pole-placement method to determine control parameters, further employs fuzzy theory to combine control parameters, generating method and steps of an MFC controlling device. The mass flow controller controlling device automation method and related system of the present invention is easily realized, simply designed and effects an enhanced production rate. MFC measurement response capabilities are enlarged, cost is reduced, and production rates are raised.

What is claimed is:

1. A controlling device automation method in an MFC, comprising the steps of:
   a. automatically controlled determining of gas pressure;
   b. automatically controlled feeding of a voltage in stages into a valve gate to drive an electric circuit;
   c. automatically controlled algorithmic obtaining of MFC open loop system parameters by an identification technique;
   d. automatically controlled algorithmic determining of PI control parameters by a dominant pole-placement method;
   e. automatic decision control of automatic judging whether measurements of gas flow rates and pressure values to be done have been finished; and
   f. automatically controlled calculating of a fuzzy logic rule table;
   said steps forming an automatically controlled single closed loop;
   wherein by performing said steps multiple PI control parameter sets are obtainable fast and in an automatic way, and a calculation is done to form a refined fuzzy rule data table, so that a greatly enhanced MFC reaction function is attained.

2. A controlling device automation method in a mass flow controller according to claim 1, wherein said step of automatically controlled algorithmic obtaining of MFC open loop system parameters by an identification technique is performed using a mathematical identification technique as follows:

$$H(z) = z^{-1} \frac{\alpha_0 + \alpha_1 z^{-1}}{1 + \beta_1 z^{-1} + \beta_2 z^{-2}}$$

where $\gamma$ is a delay time directly obtained by measurement, and $\alpha_0$, $\alpha_1$, $\beta_1$, $\beta_2$ are system model parameters obtained by mathematical calculation.

3. A controlling device automation method in a mass flow controller according to claim 1, wherein said step of automatically controlled algorithmic determining of PI control parameters by a dominant pole-placement method involves a calculation given by $$G_C(z) = K_P + K_I \frac{T_S(1 + Z^{-1})}{2(1 - Z^{-1})}$$

with dominant poles determining values of $K_P$ and $K_I$, so as to place a pole $Z_d = r\, e^{\pm j\theta}$ as a zero of a closed-loop function, yielding a relation $$1 + G_C(z)H(z)|_{z=Z_d} = 0.$$

4. A controlling device automation method in a mass flow controller according to claim 1, wherein said step of automatically controlled calculating of a fuzzy logic rule table uses a model given by $$g(i,j,k) = f(e_i, d_j, p_k) = K_P(e_i, d_j, p_k)e_i + K_I(e_i, d_j, p_k)d_j.$$

5. A controlling device automation method in a mass flow controller according to claim 4, wherein $K_P$ and $K_I$ in said model used by said step of automatically controlled calculating of a fuzzy logic rule table are average values of PI parameters obtained by a dominant pole-placement method, with a pressure value being $p_k$ and open loop system responses being $e_i$, $d_j$.

6. A controlling device automation system in an MFC, comprising:
   a computer;
   an interface;
   an automatic electronic pressure regulator, regulating an output of a gas pressure source, as controlled by said computer via said interface;
   an MFC valve-driving electric circuit, controlled by said computer via said interface, with an electric circuit board regulating a degree of opening of a valve gate; and
   a flow controlling device, controlled by said computer via said interface, performing data monitoring of actual gas flow, and constituted and assembled by a standard flow controlling device;
   wherein said computer, based on each item of monitoring data and using an identification technique, calculates MFC open loop system parameters, furthermore, using a model based on a dominant pole-placement method, calculates PI control parameters and, after having obtained sets of PI control parameters, carrying into effect a fuzzy theory model, calculates a refined fuzzy rule data table, being able to transfer data of said fuzzy rule data table to the MFC controlling device system.

7. A controlling device automation system in an MFC according to claim 6, wherein said computer is a personal computer.

8. A controlling device automation system in an MFC according to claim 6, wherein said interface is an RS 232 interface.

9. A controlling device automation system in an MFC according to claim 6, wherein said standard flow controlling device uses a known flow rate as a standard which serves as a base for correcting system parameters.

* * * * *